Patented Feb. 13, 1945

2,369,250

UNITED STATES PATENT OFFICE 2,369,250

PRODUCTION OF β-DIKETONES

William H. Reeder, III, Olean, N. Y., and George A. Lescisin, South Charleston, W. Va., assignors to Carbide and Carbon Chemicals Corporation, a corporation of New York No Drawing. Application May 18, 1943, Serial No. 487,488

12 Claims. (Cl. 260—595)

This invention relates to the production of β-diketones; and more especially it concerns their production by reacting with a carboxylic acid anhydride an ester of a β-ketonic carboxylic acid or substituted β-ketonic carboxylic acid containing at least one free alpha hydrogen, preferably in the presence of a catalyst or reaction promoter for the acylation and decarboxylation reactions involved. The invention has especial utility for the production of β-diketones by reacting an ester of acetoacetic acid containing at least one labile hydrogen atom with a carboxylic acid anhydride.

The principal reaction involved appears to be that indicated by the equation:

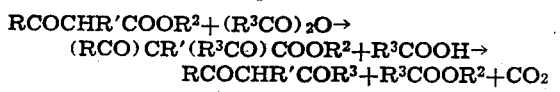

wherein R and $R^3$, respectively, designate the same or a different alkyl group; $R'$ designates an alkyl group, an alkanoyl group, or hydrogen; and $R^2$ designates an alkyl or an aryl group.

Heretofore efforts have been made to decompose diacetylacetic esters by treating the same in the cold with ammonia or the fixed alkalies. Under the conditions employed, these esters break down to produce mono-acetylactic esters and acetic acid. Likewise, attempts have been made to produce β-diketones by the interaction of acetic esters and ketones in the presence of metallic sodium, sodium ethoxide or sodamide. Such procedure involves the formation of the sodium derivative of the enolic form of the ketone, which then combines with the ester, and by loss of alcohol from the resultant product, yields the sodium derivative of the diketone. Such a procedure is not practicable for the commercial production of β-diketones.

According to the present invention, β-diketones are produced in excellent yield in connection with a readily-controlled reaction occurring in a single stage. An ester of a β-keto carboxylic acid is reacted with a carboxylic acid anhydride, preferably in the presence of an alkaline catalyst of the type hereindescribed.

In a preferred form of the invention, an ester of a β-keto carboxylic acid, a carboxylic acid anhydride, and a catalytic amount of a reaction promoter or catalyst are intermixed and heated on an oil bath in a distillation vessel provided with a dephlegmating column packed with glass helices. The reaction producing the β-diketone readily occurs at temperatures ranging from about 105° C. to temperatures as high as 135° C. at atmospheric pressure, although higher and lower temperatures may be employed, depending upon the particular β-keto acid ester and acid anhydride employed, and upon whether the reaction is conducted at atmospheric, subatmospheric or superatmospheric pressure. The reaction mixture is then fractionally distilled for the separate recovery of the β-diketone and of the ester of the carboxylic acid simultaneously produced. This may conveniently be done by distilling the reaction mixture under reduced pressure. Absolute pressures of around 100 to 400 mm. of mercury are commonly used, although higher and lower subatmospheric pressures may be utilized. If desired, the β-diketone may be recovered from the reaction mixture by adding water to the reaction mixture and steam distilling the mixture.

In practicing the invention it is highly desirable, in the interest of high yields of the β-diketone, that there be present with the reactants a small or catalytic amount of a metal of group II of the periodic system of elements, or iron or manganese, or a compound of one of such metals adapted upon hydrolysis to yield a product having an alkaline reaction. The preferred catalysts are metallic magnesium, and non-acidic magnesium compounds such as magnesium oxide, magnesium carbonate, magnesium acetate, and the magnesium diketone chelates such as the magnesium salt of methyl diacetoacetate. Yields of the β-diketone of 80% of the theoretical are securable when using magnesium-containing catalysts. Somewhat less effective catalysts are calcium, zinc and iron, and compounds of these metals, such as the oxides, carbonates and acetates thereof.

The ratio of β-ketonic acid ester to the carboxylic acid anhydride employed in the process may vary considerably, but excellent yields of the desired β-diketones are secured where the ester and the acid anhydride are employed in molar ratios of around 1 to 1. A catalyst of the type described is commonly used in a concentration of from around 0.1 to around 1% of the weight of the ester employed, although catalyst concentrations of not more than 0.5% of the ester are preferred, and favor high yields of the β-diketone.

In the practice of the invention, either of the reactants may be added in small, successive increments to the other reactant, in the presence of the catalyst. However, such procedure is not conducive to the best yields of diketone, apparently due to the occurrence of side reactions.

Likewise, the principal reaction may be conducted in the presence of an inert diluent for the reactants and for the reaction products, such as the glycol diethers, e. g., the diethers of diethylene glycol. The use of such diluents generally is not commercially advantageous and tends to prolong the induction period of the reaction.

While good results are secured by the use in the process of the higher alkyl esters of β-keto carboxylic acids, such as the ethyl and propyl esters of acetoacetic acid, the methyl ester gives particularly high yields of the desired β-diketone under readily-controlled conditions while reducing the heating time and lowering the temperatures necessary for the recovery of the β-diketone, thereby minimizing any tendency towards undesired decomposition or condensation of the reaction products.

The following examples serve to illustrate the invention:

Example 1

A mixture of 1 mol each of methyl acetoacetate and acetic anhydride, and metallic magnesium in amount corresponding to 0.1% by weight of the methyl acetoacetate, was heated in a distillation vessel connected with a column packed with glass helices, to a temperature of 140° C., for a period of five hours, by means of an oil bath. The evolved carbon dioxide escaped to the atmosphere as formed. The reaction mixture then was distilled under a subatmospheric pressure ranging from 400 to 100 mm. of mercury absolute. Following a fore-fraction containing acetic acid and some pentanedione-2,4, (acetylacetone), a main product was recovered which contained 90% to 95% of the pentanedione-2,4.

The kettle residues contained some methyl diacetylacetate. Upon adding 0.1 mol of acetic acid to such kettle residues, and heating to 140° C., the said diacetylacetate was decarbmethoxylated, yielding an additional quantity of the β-diketone. A total yield thereof of around 84.2% was secured, together with a high yield of methyl acetate.

Example 2

By reacting a mixture of 0.5 mol of methyl acetoacetate and 0.5 mol of acetic anhydride for five hours at a temperature of 140° C., in a glass reaction vessel connected with a column filled with glass helices, without the addition of any catalyst, and then steam distilling the resultant reaction mixture, a yield of about 35% of pentanedione-2,4 was obtained, together with a somewhat larger amount of methyl acetate.

Example 3

By reacting methyl acetoacetate and acetic anhydride under conditions similar to those set forth in Example 1, with the exception that magnesium acetate in amount equal to 0.5 mol per cent of the ester was substituted for the magnesium catalyst, a yield of over 80% of pentanedione-2,4 was secured.

Similarly, excellent yields were secured by reacting methyl acetoacetate and acetic anhydride under the conditions set forth in Example 1, but substituting for the magnesium catalyst, respectively, 0.54% of magnesium carbonate, 0.42% of magnesium oxide, and 0.1% of magnesium pentanedione chelate, based on the weight of the ester; while similar runs employing as catalyst, respectively, zinc dust, iron wool, calcium oxide, sodium acetate and other catalysts of the type hereindescribed give somewhat lower yields of the desired β-diketone.

There may be substituted in the process for the acetic anhydride a wide variety of fatty acid anhydrides and other aliphatic mono- and dicarboxylic acid anhydrides, such as propionic anhydride, butyric anhydride, isobutyric anhydride, caproic anhydride, octylic anhydride, and succinic anhydride, as well as mixed anhydrides, as is evidenced by the following examples.

Example 4

A mixture of 1 mol of methyl acetoacetate, 1 mol of propionic anhydride, and magnesium acetate in amount corresponding to 0.47% by weight of the ester, was heated at 140° C. until evolution of carbon dioxide had ceased. The residual reaction mixture was then fractionally distilled under an absolute pressure of around 50 mm. of mercury, and the hexanedione-2,4 produced in the reaction was separately recovered in a yield of around 58%. The methyl propionate formed in the reaction also was recovered.

Example 5

A mixture of 1 mol of ethyl acetoacetate, 1 mol of butyric anhydride, and 0.16% of magnesium oxide, based upon the weight of the acetoacetate, was reacted for 20 hours at a temperature of 142° C., the carbon dioxide formed in the decarboxylation being removed as formed. The residual reaction mixture was then distilled under an absolute pressure of around 50 mm. of mercury. The heptanedione-2,4 produced in the reaction and present in the reaction mixture, was separately recovered in good yield in the form of a liquid boiling at 90° C.

Esters of substituted β-ketonic acids are suitable for use in the process, and provide good yields of β-diketones, as is indicated in Example 6.

Example 6

A mixture of the methyl ester of alpha-ethyl-acetoacetate and acetic anhydride, containing 0.5 mol of each, together with magnesium carbonate in an amount 0.37% by weight of the said ethyl-acetoacetate ester, was reacted for four hours at a temperature of 140° C. until evolution of carbon dioxide had substantially ceased. The residual reaction mixture was then steam distilled, and the fraction boiling at 95° C. and containing the 3-ethyl pentanedione-2,4 produced in the reaction was separately recovered. A very good yield of the latter was secured.

When using in the process the catalyst or reaction promoters hereinbeforementioned, yields of β-diketones twice or more those secured in the absence of such catalyst are commonly secured.

Among esters of β-keto carboxylic acids suitable for use in the process, along with the alkyl and aryl esters of acetoacetic acid and substituted acetoacetic acids, may be mentioned similar esters of the various diacylacetic acids such as diacetylacetic methyl ester, propionylacetoacetic ethyl ester and butyrylacetoacetic methyl ester which yield, respectively, with acetic anhydride in the process, 3-acetyl pentanedione-2,4; 3-propionyl hexanedione-2,4; and 3-butyryl heptanedione-2,4.

By the practice of the present invention, esters of β-ketonic acids containing at least one free alpha-hydrogen atom are deesterified and decarboxylated in a single reaction stage, with the production of excellent yields of β-diketones which are industrially valuable as solvents and as intermediates in the production of other chemical compounds.

The term "a non-acidic magnesium-containing catalyst" is used in the claims to designate metallic magnesium, and the oxide, carbonate, acetate, and other non-acidic compounds of magnesium. Likewise, the term "an ester of a β-ketonic carboxylic acid" and similar terms, are employed in the claims to designate both esters of β-keto carboxylic acids and esters of substituted β-keto carboxylic acids wherein an alkyl or an acyl group is directly connected with an alpha-carbon atom.

The invention is susceptible of modification within the scope of the appended claims.

We claim:

1. Process which comprises reacting a β-keto carboxylic acid ester containing at least one free alpha-hydrogen atom, with a carboxylic acid anhydride, and recovering from the resultant reaction mixture the β-diketone thus produced.

2. Process for producing a β-diketone, which comprises reacting a β-keto carboxylic acid ester containing at least one free alpha-hydrogen atom, with a carboxylic acid anhydride, in the presence of a non-acidic deesterification and decarboxylation catalyst, and recovering from the resultant reaction mixture the β-diketone thus produced.

3. Process for producing a β-diketone, which comprises reacting an ester of a β-ketonic carboxylic acid with a carboxylic acid anhydride in the presence of a catalyst selected from the group consisting of the metals of group II of the periodic system, iron and manganese, and non-acidic compounds of such metals, and recovering from the resultant reaction mixture the β-diketone thus produced.

4. Process for producing a β-diketone, which comprises reacting a carboxylic acid anhydride with an ester of a β-ketonic acid of the type corresponding to the formula,

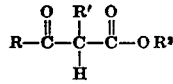

wherein R represents an alkyl group; R' represents a radical selected from the acyl groups, the alkyl groups and hydrogen; and R² represents a radical selected from the alkyl groups and the aryl groups; and recovering from the resultant reaction mixture the β-diketone thus produced.

5. Process for producing a β-diketone, which comprises reacting at an elevated temperature and in the presence of a non-acidic catalyst for the resultant deesterification and decarboxylation, a carboxylic acid anhydride with an ester of a β-ketonic acid of the type corresponding to the formula,

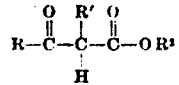

wherein R represents an alkyl group; R' represents a radical selected from the acyl groups, the alkyl groups and hydrogen; and R² represents a radical selected from the alkyl groups and the aryl groups; and recovering from the resultant reaction mixture the β-diketone thus produced.

6. Process for producing a β-diketone which comprises reacting at an elevated temperature, and in the presence of a magnesium catalyst, a carboxylic acid anhydride with an ester of a β-ketonic acid of the type corresponding to the formula,

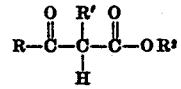

wherein R represents an alkyl group; R' represents a radical selected from the acyl groups, the alkyl groups and hydrogen; and R² represents a radical selected from the alkyl groups and the aryl groups; and recovering from the resultant reaction mixture the β-diketone thus produced.

7. Process for producing a β-diketone, which comprises decarboxylating and deesterifying an acetoacetic ester at an elevated temperature in the presence of a carboxylic acid anhydride, and recovering from the resultant reaction mixture the β-diketone thus produced.

8. Process for producing acetylacetone, which comprises reacting acetic anhydride and an acetoacetic ester at an elevated temperature in the presence of a catalyst selected from the group consisting of the metals of group II of the periodic system, iron and manganese, and non-acidic compounds of such metals, and recovering from the resultant reaction mixture the acetylacetone thus produced.

9. Process for producing hexanedione-2,4, which comprises reacting an acetoacetic ester with propionic anhydride in the presence of a non-acidic magnesium-containing catalyst, and recovering from the resultant reaction mixture the hexanedione-2,4 thereby produced.

10. Process for producing heptanedione-2,4, which comprises reacting an acetoacetic ester with butyric anhydride in the presence of a non-acidic magnesium-containing catalyst, and recovering from the resultant reaction mixture the heptanedione-2,4 thus produced.

11. Process for producing 3-ethyl pentanedione-2,4, which comprises reacting an ester of alpha-ethylacetoacetate with acetic anhydride in the presence of a non-acidic magnesium-containing catalyst, and recovering from the reaction mixture the 3-ethyl pentanedione-2,4 thus produced.

12. Process for producing a β-diketone, which comprises reacting an ester of a β-ketonic carboxylic acid with a carboxylic acid anhydride, recovering from the resultant reaction mixture the β-diketone thus produced, reacting the residual mixture with an aliphatic carboxylic acid, thereby decarbalkoxylating the alkyl diacylacetate also formed in the first-named reaction and producing a β-diketone, and recovering such β-diketone.

WILLIAM H. REEDER, III.
GEORGE A. LESCISIN.